Patented Jan. 10, 1939

2,143,512

UNITED STATES PATENT OFFICE 2,143,512

PROCESS OF MANUFACTURING LUBRICANTS

Alfred Putnam Frame, Haddonfield, N. J., assignor to Cities Service Oil Company, New York, N. Y., a corporation of Pennsylvania No Drawing. Application September 10, 1935, Serial No. 39,937

6 Claims. (Cl. 87—9)

This invention relates to a sulfurized hydrocarbon product and a process for manufacturing sulphurized hydrocarbons, particularly sulphurized polymers derived from cracked gasoline and similar materials.

Sulphurized polymers are now used in the manufacture of extreme pressure lubricants used particularly for the lubrication of transmission and other types of gears in which high pressures are developed. In accordance with certain known methods, polymers produced by the treatment of cracked gasoline with sulphuric acid, phosphoric acid, aluminum chloride, zinc chloride, adsorptive jells and clays, are sulphurized by heating the polymers formed by these polymerizing agents with a substantial percentage of sulphur. The resulting sulphur base product is thereafter blended with ordinary lubricating oils to produce the extreme pressure lubricants referred to.

Extensive experimentation in the use of polymers for producing extreme pressure lubricants has shown that polymers formed under certain conditions, for example by sulphuric acid in the usual batch agitation process, are entirely unsuited for the manufacture of extreme pressure lubricants and in fact it has been found impossible to produce a satisfactory lubricant from such polymers. This is apparently due to the long time contact between the acid and distillate.

The primary object, therefore, of the present invention is to provide a sulfurized polymer product and a process for producing sulphurized polymers of excellent quality from cracked gasoline as a step in the refining of such gasoline with concentrated sulphuric acid.

A further object of the invention is to provide a process for manufacturing sulphurized polymers which will be substantially free from disagreeable odors.

The polymers utilized in accordance with the process of the present invention are preferably produced from low boiling cracked hydrocarbons, such for example as pressure distillates containing substantial proportions of unsaturated compounds. Such distillates are produced in cracking of petroleum oils in vapor phase or in mixed liquid and vapor phase. In accordance with the features of the present invention a preferably fresh pressure distillate produced in the cracking of gas-oil in mixed liquid and vapor phase is treated with sulphuric acid in the following manner. The gasoline or pressure distillate is refined by metering it from the cracking still or run-down tank into a mixing device such as a turbo-mixer and at the same time admitting to the turbo-mixer a regulated quantity of concentrated sulphuric acid (66° Bé.). The proportion of acid to pressure distillate preferably amounts to from 1½ to 5 pounds of acid per barrel of distillate (depending upon the character of the distillate). The distillate and acid continuously introduced into the turbo-mixer are intimately agitated and mixed so that the acid is brought in contact with all portions of the distillate. The resulting mixture is continuously discharged from the mixer into the bottom of a vertical chamber of small diameter and withdrawn at a vertical point in the chamber which is adapted to give the distillate the desired necessary length of contact with the sulphuric acid for the purpose of refining the distillate to improve its gum stability and remove sulphur compounds. The contact time is, for the average distillate, about 20 seconds, but may vary from 7 to about 30 seconds. The distillate withdrawn from the time chamber is passed directly to a centrifugal separator which separates the treated distillate from the acid and acid sludge. The distillate is thereupon neutralized to complete its refining treatment after which it is ready for distribution and use as a motor fuel.

The acid sludge discharged from the centrifugal separator is conducted immediately into a dilution tank where it is diluted with about an equal quantity of water. This dilution causes a separation of unsaturated polymers contained in the acid sludge, as a polymer oil layer above a layer of dilute sulphuric acid. The oil layer which has a deep red color is removed and then neutralized with sodium hydroxide or other suitable alkali solution for the purpose of neutralizing any acid constituents which may be present in the oil. The resulting crude polymer oil which comprises from 1 to 3 per cent of the original pressure distillate treated with sulphuric acid, is the material to be sulphurized in accordance with the process of the present invention.

While the pressure distillate normally has a distillation range of from about 100° F. to about 410° F., the major part of the polymer oil distills between about 400° and 650° F.

The polymer oil produced in the manner described above is almost completely unsaturated and is therefore very active with respect to various addition agents. This oil is preferably treated in a batch by mixing therewith about twenty per cent of flowers of sulphur, and the resulting mixture is heated from room temperature up to approximately 325° F. at a rate of from 4 to 5 degrees per minute. During the heating operation the mixture of sulphur and polymer is thoroughly agitated in order to bring the sulphur into intimate contact with the oil constituents. The mixture is maintained at the final temperature for a half hour or less, or until the sulphur has completely reacted with the unsaturated polymers. The product is thereupon cooled and comprises the sulphurized hydrocarbon polymers produced by the process of the present invention.

Under certain conditions it has been found advisable where the sulphurized polymers are to be used for special types of lubrication, to add to the mixture about 10% of lard oil for the purpose of lowering its surface tension during use. This is preferably accomplished during the cooling of the product when it has reached a temperature of about 250° F. The lard oil is merely added to the sulfurized polymer at this temperature and thoroughly mixed therewith, after which the product is cooled to ordinary temperature.

The sulphur base stock produced as described above may be utilized for the manufacture of various grades of lubricants by blending the sulphur base product in varying proportions with different grades of lubricating oils. For example, a satisfactory lubricant is produced by mixing 11% of the sulphur base with 89% of 630 flash oil which has a color of about 7, a pour point of about 50° F. and a Saybolt viscosity of 260 at 210° F. Cutting oils may be made by blending the sulphur base with a suitable oil.

In the manufacture of special types of sulphurized polymer bases, it is desirable to fractionate the crude polymer oil and select a certain fraction for the manufacture of the sulphurized base. In this way a base may be produced having any desired degree of viscosity and gravity from that of a free-flowing oily liquid to that of a thick pasty material. Since the polymer oil is substantially completely unsaturated, every fraction will react with a relatively large amount of sulphur, but from tests made it has been found that the lightest fractions will take up the greatest percentage of sulphur. For example, it has been found possible to combine about 34% of sulphur with the lightest fraction whereas the heavier fractions of the polymer oil would take up and combine with only about 26% sulphur. The narrower the temperature range within which the polymer oil fraction is cut, the more nearly it approaches the pure compound which is sulphurized to produce a special type or grade of product.

As an example of the effectiveness of the sulphur base stock produced in accordance with the present invention, a blend of 11% of this stock with light bright stock (a lubricating oil) was compared with the light bright stock itself on the Timken lubricant testing machine. The light bright stock had a load-carrying capacity of 15,700 pounds per square inch with a beam load of 8 pounds, whereas the blend of light stock and sulphur base had a load-carrying capacity of 22,700 pounds per square foot with a beam load of 40 pounds. These tests were made with a rubbing speed of 400 feet per minute.

While the process of the present invention has been described in substantial detail and certain examples given, it is to be understood that while the short time of contact between the pressure distillate and acid is highly important, the various detailed features of the process may be varied without departing from the spirit of the present invention. For example, it is usually not advisable to try to add excessive proportions of sulphur to the polymer oil since a base product containing from 10 to 18 per cent is highly satisfactory and is readily produced without heating the oil and sulphur mixture for any extensive period of time.

Having thus described the invention in its preferred form, what is claimed as new is:

1. In the process of manufacturing a highly sulfurized oil in which the sulfur is chemically combined in the hydrocarbon compounds comprising the oil, the improvement which comprises intimately contacting a highly unsaturated light petroleum distillate with concentrated sulfuric acid for a relatively short period of time of not more than approximately thirty seconds, rapidly separating the resulting acid sludge from the treated distillate, diluting the acid sludge whereby unsaturated hydrocarbon polymers produced by the acid and contained in the sludge are separated as a layer from the resulting dilute acid, recovering the unsaturated polymer oil and chemically combining therewith under sulfurizing conditions from 10% to 35% of sulfur whereby a sulfurized polymer oil is produced from the polymers formed from said unsaturated distillate.

2. The process of sulfurizing an unsaturated polymer oil to produce a blending stock adapted to increase the load carrying capacity of mineral oil lubricants, which comprises mixing unsaturated hydrocarbon polymers with from 10% to 35% of sulfur, and chemically reacting the mixture to chemically combine the sulfur with the polymers under sulfating conditions, said polymers comprising the unsaturated hydrocarbon polymerized product resulting from the treatment of a light cracked petroleum oil distillate with concentrated sulfuric acid by contacting the two for a period of time of not more than approximately thirty seconds, separating the resulting acid sludge from the distillate, diluting the acid sludge to cause a separation of unsaturated hydrocarbon polymers as a layer, and recovering the said layer as said polymers.

3. A blending compound for increasing the load carrying capacity of mineral oil lubricants, comprising unsaturated oil polymers containing a substantial proportion of chemically combined sulfur, said unsaturated oil polymers being produced by intimately contacting a cracked light petroleum oil distillate with concentrated sulfuric acid for a period of from approximately seven to thirty seconds, quickly separating the resulting acid sludge from the distillate, diluting the acid sludge to liberate the oil polymers contained therein, separating the oil polymers from the diluted sludge and neutralizing the separated oil polymers.

4. A highly sulfurized oil stock for blending with and for increasing the load carrying capacity of oily lubricants, comprising unsaturated oil polymers containing from 10% to 35% of chemically combined sulfur, said oil polymers being produced by intimately contacting a highly unsaturated cracked petroleum distillate with concentrated sulfuric acid in the proportion of about 3 pounds per barrel of distillate, continuing said contacting for a period of not more than approximately thirty seconds and then quickly separating the resulting acid sludge from the distillate, diluting the acid sludge to liberate polymers therefrom and recovering said polymers.

5. A highly sulfurized oil stock as defined by claim 4 which includes approximately 10% of lard oil as a surface tension lowering medium for the lubricant with which the stock is mixed.

6. A blending compound for increasing the load carrying capacity of oily lubricants, comprising an unsaturated oil polymer fraction having a desired boiling range containing from 10% to 35% of chemically combined sulfur, said unsaturated oil polymer fraction being produced by intimately contacting a cracked light petroleum oil distillate with concentrated sulfuric acid for a period not substantially exceeding thirty seconds, separating the resulting acid sludge from the distillate, diluting the acid sludge to liberate the oil polymers contained therein, separating the oil polymers from the diluted sludge, and fractionally distilling the oil polymers to produce a plurality of fractions having different boiling ranges.

ALFRED PUTNAM FRAME.